Patented June 6, 1944

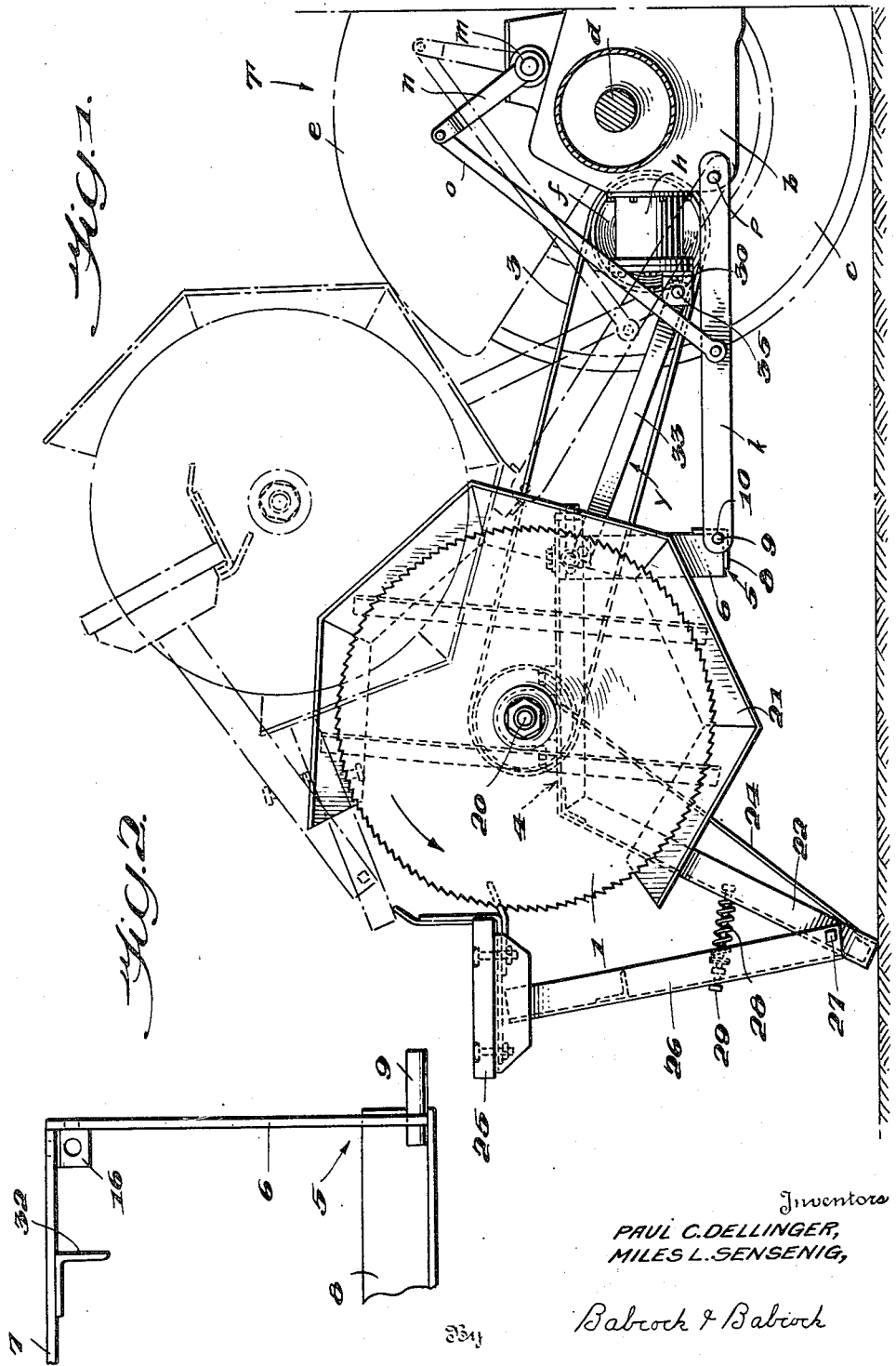

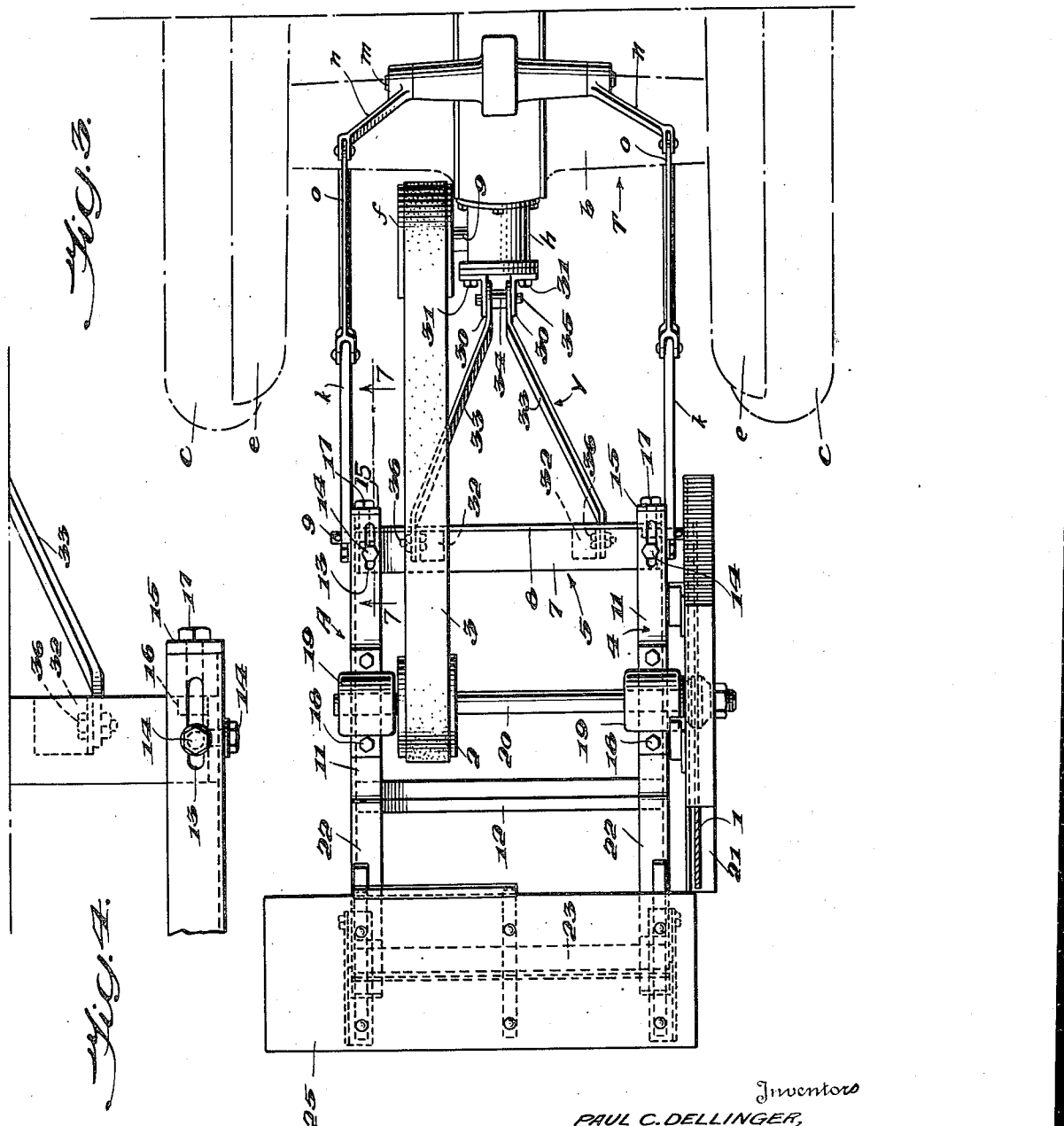

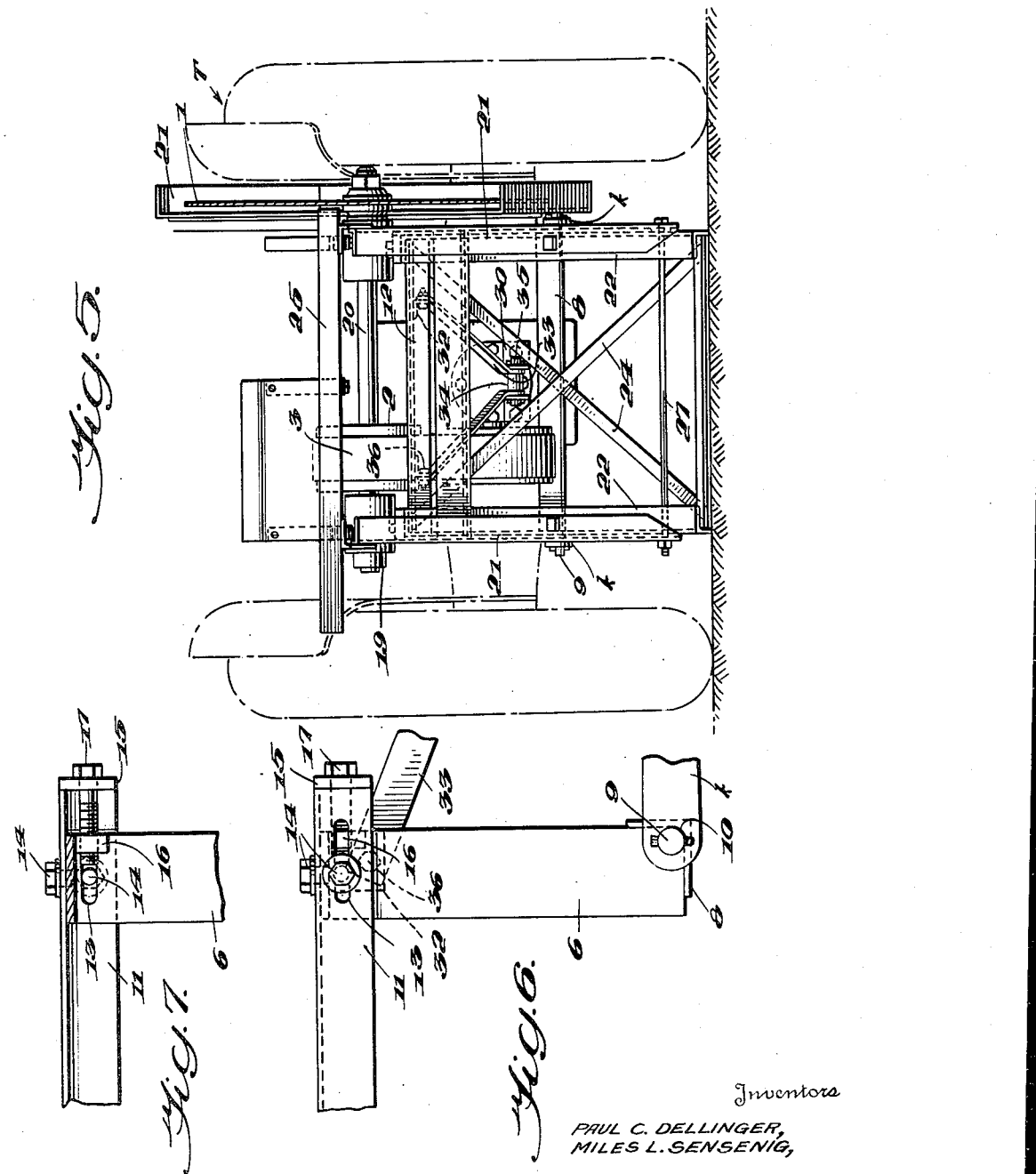

2,350,880

UNITED STATES PATENT OFFICE 2,350,880

SAW ATTACHMENT FOR TRACTORS

Paul C. Dellinger and Miles L. Sensenig, Lancaster, Pa., assignors to Dellinger Manufacturing Company, Lancaster, Pa., a corporation of Pennsylvania Application September 9, 1941, Serial No. 410,220

5 Claims. (Cl. 143—43)

This invention relates to saw attachments for tractors equipped with implement lift mechanism.

The primary objects of the invention are to provide a saw attachment which is mounted on the implement lift mechanism of the tractor for swinging movement therewith into operative and inoperative positions; to provide such an attachment wherein the saw supporting table or portion of the frame is automatically retracted towards the power take-off mechanism of the tractor to render the drive transmitting means to the saw inoperable in the upwardly swung inoperable position of the implement lift mechanism; to provide such an attachment which swings upwardly relative to the implement lift mechanism during upward movement of the latter, in order to retract the saw supporting portion thereof as aforesaid and at the same time provide a considerable clearance of the saw attachment relative to the ground and objects thereon responsive to a relatively small upward movement of the implement lift mechanism; and to provide means permitting adjustment of the belt tension where a belt is employed as the power transmitting means between the tractor and saw.

In this application we show and describe only the preferred embodiment of our invention simply by way of illustration of the practice thereof, as by law required. However, we recognize that the invention is capable of other and different embodiments, and that the details thereof may be modified in various ways, all without departing from our invention; therefore, the drawings and description herein are to be considered as illustrative and not exclusive.

In the accompanying drawings:

Figure 1 represents a side elevation of our invention as applied to a tractor, the tractor being shown fragmentarily;

Figure 2, a detail fragmentary rear view of the pivoted base portion of the saw frame;

Figure 3, a plan view of the invention as applied to the tractor shown in Figure 1;

Figure 4, an enlarged fragmentary plan view showing the adjustable connection or belt tightening arrangement of the two parts of the saw frame employed in the preferred embodiment of the invention;

Figure 5, an end elevation of the preferred embodiment of the invention as applied to a tractor;

Figure 6, an enlarged fragmentary side elevation of the adjustable connection illustrated in Figure 4; and, Figure 7, an enlarged detail section on the line 7—7 of Figure 3, looking in the direction of the arrows and the corresponding arm or link $k$ being omitted, this view further illustrating the adjustable connection shown in Figures 4 and 6.

Referring now in detail to the accompanying drawings, the letter T designates in its entirety any usual form of tractor (the rear end of said tractor only being shown) comprising the usual differential housing $b$, rear wheels $c$, axle $d$, and fenders $e$, all assembled in the usual manner. The tractor is equipped with suitable power take-off mechanism $f$ which may consist of the usual drive pulley. The pulley $f$ is fixedly carried by a shaft $g$ rotatably journalled in and extending into a pulley gear box $h$ fixedly mounted on the differential housing $b$. Inasmuch as the driving means for rotating the pulley $f$ are not claimed as my invention, but are old and well known in the art, it is not believed necessary to show or describe this arrangement in detail other than to state that said means may be substantially as shown and described in the Dibble Patent 1,798,402, consisting of suitable bevel gearing transmitting rotation to shaft $g$ from the usual power take off shaft of the tractor extending rearwardly through the differential housing $b$ into the gear box $h$ at right angles to the shaft $g$.

Also the tractor T is equipped with any usual form of implement lift mechanism which may comprise supporting arms or links $k$ pivotally mounted thereon for substantially vertical swinging movement, and suitable means for raising and lowering the arms or maintaining them stationary in any desired position. The preferred arrangement of such arms or links $k$ and operating means therefore, as illustrated, is substantially as shown and described in Patents 2,230,002 and 2,118,180 to H. G. Ferguson. According to such arrangement, the rigid supporting or lift arms $k$ are pivoted to the differential housing $b$ as at $p$ for substantially vertical swinging movement, and the means for swinging said arms or maintaining them in various positions consists of a hydraulically actuated rock shaft $m$ having arms $n$ fixedly secured thereto to impart swinging movement to the lift arms $k$ through the connecting links $o$ in order to raise or lower said arms, all as shown and described in said Ferguson patents.

Our invention, as applied to such a tractor, comprises in general a saw frame, designated A is its entirety, which carries a saw or other implement $l$ and drive receiving mechanism 2 therefore. The saw frame A is carried by the arms $k$ so that it may be swung upwardly thereby out of operative position and clear of the ground when it is desired to move the tractor to a new location. The saw frame A is disposed for movement relative to the lift mechanism or arms k in such manner that the drive receiving mechanism 2 carried by said frame may be disposed in positions comparatively remotely spaced relative to the power take-off mechanism f in the extended position of the frame A, shown in full lines in Figure 1, and closely spaced relative to said mechanism f in the retracted position of the frame A, shown in broken lines in Figure 1. Power transmitting means 3 is disposed to establish a driving connection between the power take-off mechanism f and drive receiving mechanism 2 in the extended position of the frame A, said means being inoperative in the retracted position of said frame. A rigid positioning yoke Y is pivotally attached to and connects the tractor T and saw frame A to so govern the position of the frame A responsive to the position of the supporting arms k that in the downwardly swung position of the arms k the frame is in extended operative position, and in the upwardly swung or raised position of the arms k the frame A is in retracted inoperative position.

In the specific embodiment of the saw frame A illustrated, the same is mounted for swinging movement relative to the arms k and comprises a swingably mounted normally upright base portion 5 carried at the free ends of the power lift or supporting arms k for swinging movement about its lower edge portion, and a normally substantially horizontal rearwardly extending saw table or saw supporting portion 4 rigidly attached to and carried by said portion 5, and preferably adjustable thereon towards or away from the power take off mechanism or drive pulley f to adjust the belt tension where a belt 3 is employed as the power transmitting mechanism between the mechanisms f and 2.

Referring more specifically to the preferred construction of the saw frame A, the swingably mounted base portion 5 thereof may be in the form of a unitary rigid normally upright rectangular frame comprising relatively spaced side members 6 and top and bottom members 7 and 8 respectively, said members being rigidly assembled in any suitable manner, as by welding, all as shown in Figure 2.

The base portion 5 is adapted to be substituted for the rotatable drawbar usually carried by the supporting arms k and to this end the bottom member 8 thereof may be provided at its ends with pivot pins or trunnions 9 rigidly secured thereto. In the assembled condition of the base member 5 on arms k, the trunnions 9 are journalled through transversely opposed bearing holes or bores 10 in the free ends of the arms k to provide the desired pivotal or swingable mounting for the saw frame A.

The adjustable portion or saw table portion 4 carried by said base portion 5 preferably comprises a pair of normally substantially horizontal angle irons or beams 11 rigidly adjustably secured at their forward ends to the base portion 5, and suitable bracing and reinforcing means such as the transverse brace 12 secured across the rear end portions of said beams 11. Preferably each of the beams 11 is disposed with its horizontal and vertical flanges respectively lying flush against the top member 7 and one of the side members 6 of the base portion. These beams 11 are provided on each of their flanges with longitudinal slots 13 through which are passed bolts 14 securing them to the base 5, the slots 13 permitting longitudinal movement of the saw table 4 when all of the bolts 14 are loosened. Preferably each of the beams 11 is provided with a rigidly secured medially apertured end plate 15, and the top member 7 of the base is provided with a pair of nuts 16 rigidly secured thereto in longitudinal alignment with said respective plates 15. Adjusting screws 17 are freely longitudinally slidably disposed through the apertures of the respective end plates 15 into operative engagement with the threaded portions of the nuts 16, so that when the screws 17 are tightened, after first loosening the bolts 14, the heads thereof will engage the end plates 15 and move the saw table portion 4 of the frame rearwardly to cause tightening of the belt 3. After the table 4 has been adjusted to the desired position, the bolts 14 may be tightened to secure the same firmly in place.

Fixedly secured on the beams 11, as by means of bolts 18, are a pair of transversely opposed bearings 19, 19 through which is journalled the saw shaft 20 carrying the usual circular saw l for rotation therewith. The driven saw mechanism 2 may comprise a pulley also mounted on the shaft 20 for rotation therewith, as shown; and the power transmitting means or mechanism may comprise any usual form of belt 3 disposed in operative relation around the pulleys f and 2.

If desired, any suitable form of saw guard 21 may be carried by the saw table 4 in operative relation to the saw l to protect the operator and other persons from injury by accidental contact with the saw.

Also, if desired, a ground engaging supporting foot 22 may be carried by the frame portion 4 to aid in supporting the same in proper operative position; however, although highly desirable, this is not absolutely essential inasmuch as the arms k, when maintained in fixed position, will obviously cooperate with the yoke Y to maintain the saw frame A in stationary position. Where such a supporting foot 22 is employed the same may advantageously consist of a pair of depending members preferably integral with and constituting downwardly bent continuations of the beams 11, said members preferably being connected and braced at their lower ends by a transverse angle iron brace 23. In addition, suitable criss-cross braces 24, 24, extending diagonally between transversely opposed members 11 and 22 respectively, may be employed to brace the supporting foot in a rigid position relative to the saw table 4.

Where it is desired to employ a work carriage in conjunction with the saw, the carriage may consist of any usual form of work supporting table 25 mounted for swinging movement towards and away from the saw l on a carriage frame 26 pivoted at its lower end to the supporting foot 22, as by a pivot rod 27 passing through and pivotally connecting the lower end portions of said carriage and foot. The carriage may normally be maintained resiliently swung away from the saw by usual means such as compression springs 28 disposed about guide rods 29 slidably extending through adjacent portions of the foot 22 and the carriage frame 26, said springs pressing said foot and frame apart. The enlarged ends of the rods 29 may serve to limit the swinging movement of said carriage.

The yoke, designated Y in its entirety, may be pivotally connected to the tractor T and to the saw frame A at any of various points so long as the arrangement is such as will cause the saw pulley 2 to move toward the power take-off pulley f during upward swinging movement of the arms k and frame A carried thereby, such movement toward the power take-off pulley preferably being in the form of upward swinging movement relative to the arms k during upward swinging movement of the latter.

In the preferred arrangement illustrated, the yoke Y is pivotally attached to the pulley gear housing h for swinging movement about a horizontal axis disposed rearwardly of and below the rotational axis of the pulley f, whereby it may be seen that during upward swinging movement of the yoke Y the free end thereof will move in an arc which approaches the rotational axis of the pulley f, and inasmuch as the free end of said yoke is attached to the saw frame A, said frame and the pulley 2 carried thereby must also approach the pulley f. In order to obtain the swinging movement of the saw frame A on arms k, as preferred, it will be noted that the axis of swinging movement of the yoke Y is disposed rearwardly of that of the arms k, and the yoke Y, which is shorter than the arms k, will have its free end swinging through an arc of shorter radius than that of the arms k. Inasmuch therefore as the yoke is attached to the member 7 of the saw frame at a point substantially above the point of attachment of the arms k to said frame, the base portion 5 of the frame linking the free ends of the arms k and yoke Y together will be tilted to cause such relative swinging movement of the entire frame A during swinging movement of the arms k.

In addition to releasing the belt tension, such relative swinging movement of the frame A is desirable in that it affords greater compactness and a greater amount of clearance relative to the ground and objects thereon than could be obtained by relying solely on the comparatively limited amount of swinging movement available in the usual power lift mechanism.

In order to adapt the pulley gear housing to provide a suitable pivotal mounting for the yoke Y, a pair of transversely spaced angle brackets 30 are mounted thereon by means of bolts 31 which also serve to hold the rear plate of said housing in position. These bolts 31 are slightly longer than the bolts normally employed in their place prior to application of the brackets, but aside from this, no other change need be made in the pulley gear housing, or other parts of the tractor.

Substantially similar brackets 32 may be mounted on the under side of the top member 7 of the frame base portion 5, these latter however preferably being more widely spaced than the brackets 30.

Obviously the yoke Y may take various forms, however in the preferred embodiment of the invention the yoke comprises a pair of identical symmetrically arranged rigid yoke members 33 relatively closely spaced at one end to fit between the brackets 30, and preferably rigidly connected at said end by means of a hollow sleeve 34 extending transversely between and connected to said respective members 33. The narrow end of the yoke Y is disposed between the brackets 30 and pivotally connected thereto for substantially vertical swinging movement by means of a pivot pin 35 extending transversely through registering bores in said brackets 30, sleeve 34 and the adjacent end portions of said members 33. The opposite ends of the members 33 are respectively pivotally attached to the brackets 32 of the frame 5 by suitable means such as bolts 36, as shown in detail in Figures 4 and 6, it being noted that the relatively widely spaced arrangement of the brackets 32 serves to afford lateral or transverse stability of the saw frame.

In setting up the saw for operation after the tractor has been moved to the desired location, the implement lift mechanism comprising the supporting arms k is lowered until the supporting foot 22 rests on the ground and the belt 3 is stretched taut between the two pulleys f and 2 to establish a driving connection therebetween, whereupon pieces of wood or other material to be cut are placed on the carriage table 25 and swung into operative engagement with the saw l in the usual manner. It will be noted that the belt 3, which is disposed to rotate the saw l in the direction indicated by the arrow in Figure 1, will tend to urge the frame l downwardly, thereby aiding to maintain the same in operative position.

When it is desired to move the tractor T to a new location, the supporting arms k may be swung upwardly, carrying the saw frame A therewith and simultaneously causing the yoke Y to swing the saw frame relative to said arms k into retracted position with the foot 22 well clear of the ground, as indicated in dotted lines in Figure 1.

We claim:

1. A saw attachment for a vehicle having a power take-off drive means including a drive pulley and a drive belt to be disposed about said drive pulley and a driven pulley and equipped with implement lift mechanism including rigid lift lever means having one end portion pivotally mounted on some fixed portion of said vehicle in front of the axis of said power take-off drive pulley for vertical swinging movement upward to raised inoperative position or downward to normal operative position, said attachment comprising a substantially vertically disposed rigid base member, means for pivotally attaching said base member adjacent its lower portion to the free end portions of said lift lever means for swinging movement relative thereto, a saw table rigid with and carried by said base member, a saw shaft rotatably journaled on said table, a saw and a driven saw pulley both mounted on said shaft for rotation therewith, and a rigid link means to be mounted for swinging movement about an axis located rearwardly of the axis of the pivotal mounting of said lift lever means on said vehicle, said link means being of less length than said lift lever means and being pivotally connected to the upper portion of the base member to cause upward swinging movement of said base member and table and the driven pulley as a unit about the axis of the pivotal connection of said base member to said lift lever means when the lift lever means is raised and reverse relative movement of said base member when said lift lever means is lowered.

2. A saw attachment for a vehicle having a power take-off drive means including a drive belt pulley and a drive belt to be disposed about said drive pulley and a driven pulley and equipped with implement lift mechanism including rigid lift lever means having one end portion pivotally mounted on some fixed portion of said vehicle for vertical swinging movement upward to raised inoperative position or downwardly to lowered inoperative position, said attachment comprising a rigid base member to be pivotally attached to the free end portion of said lift lever means, a saw table rigid with and carried by said base member, a shaft rotatably journalled on said table, a driven pulley mounted on said shaft to turn therewith, and rigid link means having an anchor end portion to be pivotally connected to a part fixed relative to said vehicle to swing about an axis fixed with relation to the axis of said drive means and parallel to but distinct from the axis of swinging movement of said lever and a free end portion pivotally connected to said base member at a point spaced from the pivotal connection between said lever and base member, the free end portions of said lever means and said link in the applied operative relation of the attachment moving through eccentric axes to compel said base member to tilt in accordance with the swinging movement of said lever and link about their respective axes to cause the axis of said driven pulley to move away from the axis of said drive pulley to tension the belt and drive the driven pulley from the drive pulley as the lever means are lowered to operative position and to cause the axis of said driven pulley to move toward the axis of the drive pulley to slack the belt and prevent rotation of the driven pulley as the said lever means are raised to inoperative position.

3. A rotary tool mounting, positioning and controlling attachment for an ambulatory source of power having a power take-off rotary drive means and a rigid lever having one end portion connected to swing about an axis fixed with relation to the axis of said drive means, said attachment comprising a rigid unitary element, a driven shaft mounted for rotation on said element about an axis fixed with relation to said element, a tool mounted on said driven shaft for rotation therewith, means to pivotally connect said rigid element to the free end of said lever to swing therewith and tilt with relation thereto, and a rigid link having its free end pivotally connected to said unitary element at a point spaced from the pivotal connection between said lever and element and to be pivotally connected by its anchor end portion to swing about an axis fixed with relation to the axis of said drive means and parallel to but distinct from the axis of swinging movement of said lever, and transmission means for transmitting power from said power take-off to said driven shaft, the free end portions respectively of said lever and link in the applied operative relation of the attachment moving through eccentric arcs to compel said element to tilt in accordance with the swinging movement of said lever and link about their respective axes to thereby vary the distance between said rotary power take-off and said driven shaft to automatically render said transmission means inoperative in one position of said lever and link and to automatically render said transmission means operative in a different position of said lever and link.

4. An ambulatory source of power having a power take-off rotary drive means and a rigid lever having one end portion connected to swing about an axis fixed with relation to the axis of said drive means, in combination with a rotary tool mounting, positioning and controlling attachment comprising a rigid unitary element, a driven shaft mounted for rotation on said element about an axis fixed with relation to said element, a tool mounted on said driven shaft for rotation therewith, means to pivotally connect said rigid element to the free end of said lever to swing therewith and tilt with relation thereto, and a rigid link having its free end pivotally connected to said unitary element at a point spaced from the pivotal connection between said lever and element and to be pivotally connected by its anchor end portion to swing about an axis fixed with relation to the axis of said drive means and parallel to but distinct from the axis of swinging movement of said lever, and transmission means for transmitting power from said power take-off to said driven shaft, the free end portions respectively of said lever and link in the applied operative relation of the attachment moving through eccentric arcs to compel said element to tilt in accordance with the swinging movement of said lever and link about their respective axes to thereby vary the distance between said rotary power take-off and said driven shaft to automatically render said transmission means inoperative in one position of said lever and link and to automatically render said transmission means operative in a different position of said lever and link.

5. A rotary tool mounting, positioning and controlling attachment for an ambulatory source of power having a power take-off drive means and a lever having one end portion connected to swing about an axis fixed with relation to the axis of said drive means, said attachment comprising a rigid unitary element, a driven shaft mounted for rotation on said element about an axis fixed with relation to said element, a tool mounted on said driven shaft for rotation therewith, means to pivotally connect said rigid element to the free end of said lever to swing therewith and tilt with relation thereto, and a link bar having its free end portion pivotally connected to said unitary element at a point spaced from the pivotal connection between said lever and element and to be pivotally connected by its anchor end portion to swing about an axis fixed with relation to the axis of said drive means and parallel to but distinct from the axis of swinging movement of said lever, and transmission means for transmitting power from said power take-off to said driven shaft, the free end portions respectively of said lever and link bar in the applied operative relation of the attachment moving through non-parallel paths to compel said element to tilt in accordance with the swinging movement of said lever and link bar about their respective axes to thereby vary the distance between said rotary power take-off and said driven shaft to automatically render said transmission means inoperative in one position of said lever and link bar and to automatically render said transmission means operative in a different position of said lever and link bar.

PAUL C. DELLINGER.
MILES L. SENSENIG.